United States Patent [19]

Peoples

[11] Patent Number: 5,719,925
[45] Date of Patent: Feb. 17, 1998

[54] METHOD FOR REMOTELY CONTROLLING A TELEPHONE LOOP/CHANNEL FROM ANOTHER TELEPHONE LOOP/CHANNEL

[76] Inventor: John T. Peoples, 14 Blue Jay Ct., Warren, N.J. 07059

[21] Appl. No.: 413,267

[22] Filed: Mar. 30, 1995

Related U.S. Application Data

[63] Continuation-in-part of Ser. No. 204,087, Mar. 2, 1994, Pat. No. 5,438,616.

[51] Int. Cl.⁶ .............................. H04M 3/42; H04M 7/00
[52] U.S. Cl. ...................... 379/201; 379/202; 379/211; 379/219
[58] Field of Search .................. 379/201, 202, 379/203, 207, 211, 212, 221, 67, 88, 89, 355, 219, 220

[56] References Cited

U.S. PATENT DOCUMENTS

| | | | |
|---|---|---|---|
| 4,893,335 | 1/1990 | Fuller et al. | 379/355 |
| 4,903,289 | 2/1990 | Hashimoto | 379/67 |
| 5,029,197 | 7/1991 | Hashimoto | 379/67 |
| 5,172,404 | 12/1992 | Hashimoto | 379/67 |
| 5,187,735 | 2/1993 | Garcia | 379/211 |
| 5,414,756 | 5/1995 | Levine | 379/67 |
| 5,438,616 | 8/1995 | Peoples | 379/211 |
| 5,448,627 | 9/1995 | Ueno et al. | 379/67 |
| 5,452,347 | 9/1995 | Relglehart | 379/211 |

*Primary Examiner*—Harry S. Hong

[57] ABSTRACT

Techniques for establishing a connection between a calling party and a called party using the processing of a controller located on a customer premises and served by two incoming telephone loops or ISDN-type channels so as to minimize telephone costs, preserve privacy, and provide heretofore unavailable services. After a first telephony connection is established with the calling party over the secondary loop/channel, the calling party provides control information to the controller. The controller utilizes the control information to establish a connection over the primary loop/channel, and the primary and secondary loops/channels are bridged so that the calling party may monitor the call progression on the primary loop/channel and provide supplemental control information, as needed.

12 Claims, 10 Drawing Sheets

METHOD FOR REMOTELY CONTROLLING A TELEPHONE LOOP/CHANNEL FROM ANOTHER TELEPHONE LOOP/CHANNEL

CROSS-REFERENCE TO RELATED APPLICATION

This is a continuation-in-part of application Ser. No. 08/204,087 filed Mar. 2, 1994, now U.S. Pat. No. 5,438,616.

BACKGROUND OF THE DISCLOSURE

1. Field of the Invention

This invention relates to telephony-type communication systems and, more particularly, to establishing call connections by remotely accessing each customer individually and then remotely completing the connection between the customers.

2. Description of the Background Art

The art is devoid of teachings or suggestions pertaining to customer-premises equipment in connection with techniques for: (1) minimizing the cost of toll-type calls for the customer by remotely utilizing two incoming telephone lines serving the customer premises; or (2) preserving the privacy of a called telephone number and, hence, a called party, as placed by a calling party by remotely using the two incoming telephone lines serving the given customer premises; or (3) providing heretofore unavailable services such as remotely canceling call forwarding to a first call-forward number and remotely establishing call forwarding to a second call-forward number. (Even though the techniques are couched in terms of two incoming telephone lines to a party, those with ordinary skill in the art will readily appreciate equivalents to such an arrangement of two incoming telephone lines, such as a single Integrated Services Digital Network (ISDN) wherein two B-channels may serve as the equivalent of two incoming lines.)

Thus, a need exists in the art for such services, encompassing both circuitry and methodology, for providing such cost-minimizing, privacy-preserving techniques, or telephony services which have no counterpart in the presently-existing telecommunications technology.

A first patent representative of the technological field of the present invention is U.S. Pat. No. 5,251,250 issued to Obata et al (Obata). In Obata, there is shown a method and circuitry for storing a caller's telephone number as data in a memory wherein callers' telephone numbers received during an automatic telephone answering state can suitably be retained as data. Later, a user having local access to the memory bank can display the stored telephone numbers to learn about the callers' telephone numbers placed during the user's absence.

A second patent representative of the field is U.S. Pat. No. 4,724,539 issued to Hiskes. As disclosed in Hiskes, a customer is assumed to subscribe to the "third-party" calling service offered by a local exchange carrier. In order to allow the use of the third-party feature, a device is placed at the customer premises which imitates the actions of a person at the customer premises who desires to initiate a third-party or conference call between two other remotely located parties. The device is remotely controlled by a calling party to instruct the device to initiate the conference call to the other parties (one of whom may be the original calling party). The ability to provide such a remote conferencing capability is dependent upon the availability of third-party calling service in the area serving the customer; moreover, the use of a single subscriber line is limiting in the types of new services that may be controlled remotely.

SUMMARY OF THE INVENTION

These shortcomings and other limitations and deficiencies are obviated in accordance with the present invention by circuitry which couples two customer premises loops or ISDN B-channels to thereby mitigate telephone cost and preserve privacy as well as effecting new services heretofore not contemplated.

Broadly, in accordance with one method aspect of the present invention, a calling party and a called party are interconnected with a controller, generally the calling party being at a location remote from the called party and the controller, with the called party also being at a location remote from the controller. Initially, a first connection is established between the calling party and the controller by the calling party placing a telephone call over a secondary telephone loop/channel to a telephone number to which the controller is responsive. Once this connection is established, the controller draws dial tone on a primary loop/channel and bridges the secondary loop/channel to the primary loop/channel so that the remotely-located calling party may provide information to the primary loop/channel, such as the telephone number of the called party.

In another aspect of the present invention, rather than draw dial tone on the primary loop/channel immediately, the calling party provides a password code to the controller for verification purposes. Then dial tone is drawn on the primary loop/channel and bridging of the primary and secondary loops/channels is effected so the calling party may provide control information to the primary loop/channel.

In yet another aspect of the present invention, a menu of operations is presented to the calling party after the calling party is connected to the controller; the calling party may remotely access and select a desired operation, and a set of sub-operations are then carried out by the controller, such as drawing dial tone on the primary loop/channel and then bridging the loops/channels. Other operations, either remotely controlled directly by the calling party or via a menu of selectable operations include: speed dial; call forwarding; cancel call forwarding; and call back.

In still another aspect of the present invention, the controller is arranged to call a stored number upon the receipt of two separate ringing signals within a brief, predetermined time period. The stored number is generally associated with the calling party, and once the calling party answers, the aforementioned direct operations or menu of operations may be invoked by the calling party.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in providing telephony-type services.

Figure 1:
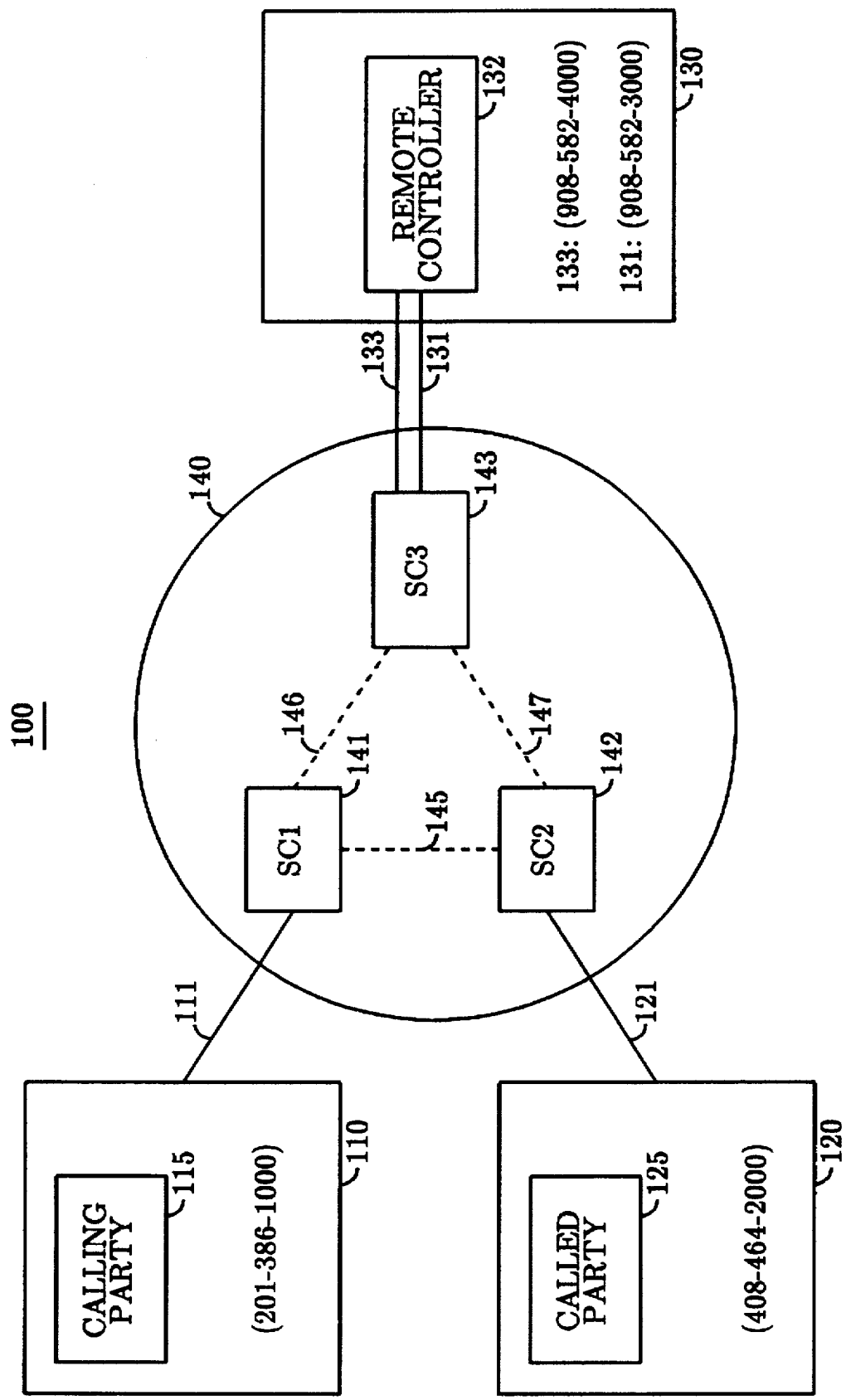
FIG. 1 illustrates a high-level block diagram of the telephone loop switching controller used to interconnect a calling party to a called party using two separate subscriber loops.

With reference to FIG. 1, there is shown high-level block diagram 100 illustrating public switched telephone network 140 for interconnecting calling party 115 at location 110 to called party 125 at location 120; the description of the operation of FIG. 1 is useful for contrasting the conventional interconnecting arrangement with an arrangement in accordance with the present invention (which will be described in detail shortly). Calling location 110 is connected to telephone network 140 via subscriber loop 111 terminating on switching center 141 (SC1), whereas called location 120 is connected to telephone network 140 via subscriber loop 121 terminating on switching center 142 (SC2). Illustratively, subscriber loop 111 is assigned a telephone number given by 201-386-1000 (area code-NNX-exchange number), whereas subscriber loop 121 is assigned telephone number 408-464-2000; for the sake of specificity, area code 201 is in New Jersey and area code 408 is in California.

Conventionally, if calling party 115 desires to communicate with called party 125, calling party 115 "keys-in" or dials the telephone number (408-464-2000) assigned to subscriber line 121, i.e., location 120, of called party 125, and the call is setup by linking serving center 141 with serving center 142 via INTER-LATA connection 145 which may be provided by an inter-exchange carrier (IXC). The cost for such an established call generally depends upon the manner in which calling party 115 initiated the call. For example, calling party 115 may have directly "keyed-in" the telephone number assigned to the location of called party 125 (1-408-464-2000) from a private residence so the call will be billed to the calling telephone number (201-386-1000); on the other hand, calling party 115 may have arranged to have the called billed to his/her calling card by first "keying in" 0-408-464-200 and then "keying in" the credit card number to be billed. If the call was placed from a public "coin" telephone (not shown) at location 110, the total bill may also include a component charged by the local provider of the "coin" telephone equipment.

It is now supposed, in accordance with one aspect of the present invention, that calling party 115 desires to communicate with called party 125 but further desires to have the call automatically charged to another telephone number, say 908-582-3000 at location 130, without intervention and/or knowledge on the part of the IXC or the local exchange carrier (LEC); this number is the primary telephone number assigned to remote location 130 which is served from switching center 143 (SC3) of network 140 via subscriber line 131. It may be that calling party 115 (who is the one assigned 908-582-3000) is merely visiting a private residence assigned telephone number 201-386-1000 and does not wish to impose upon the owner of the residence by having a potentially large toll charge billed directly to such owner, but would rather shift the burden of the cost to himself/herself by having the call billed to his/her primary home telephone number, namely, 908-582-3000 (which is also in New Jersey). If remote location 130 is served by two telephone lines 131 and 133 being assigned primary telephone number 908-582-3000 and secondary telephone number 908-582-4000, respectively, then it is possible to mitigate the telephone charges to 201-386-1000 by introducing remote controller 132 at location 130 and configuring controller 132 to operate generally according to the following steps:

(a) establishing a connection with calling party 115 via the secondary loop 133 (that is, calling party 115 "keys-in" 1-908-582-4000 from location 110, thereby interconnecting party 115 to remote controller 132 via loop 111, INTER-LATA path 146 linking switching centers 141 and 143, and loop 133);

(b) receiving and storing call-back telephone number 1-201-386-1000 and called telephone number 1-408-464-2000 "keyed-in" by calling party 115;

(c) upon breaking the connection between calling party 115 and controller 132 (e.g. by pay 115 hanging up), controller 132 initiates a return call via secondary loop 133 to calling party 115 by "keying" 1-201-386-1000 (which call will be carried by loop 133 to SC3, LATA path 146 to SC1, and loop 111) and then initiates another calling activity to place another call via primary loop 131 to 1-408-464-2000 (which call is carried by loop 131 to SC3, LATA path 147 to SC2, and loop 121);

(d) whenever called party 125 answers the incoming call, automatically bridging party 115 to party 125 via bridging circuitry in controller 132 for communication; and (e), upon termination of the bridged call, controller 132 automatically resets to accept another incoming call, and connections over loops 131 and 133 are taken down.

From this description, it is clear that the only charge to the owner of telephone number 201-386-1000 is a short INTRA-LATA call to secondary telephone number 908-582-4000. The significant cost is borne by the party assigned both telephone numbers 908-582-3000 and 908-582-4000 (in this example, visiting calling party 115) since simultaneous INTRA-LATA and INTER-LATA calls result from the desired connection between party 115 at location 110 and party 125 at location 120. (It is worthwhile to note that the foregoing description has advantageously utilized two, remotely bridged telephone lines to provide the "call-back" service—often two such lines are available because a customer at location 130 has a second line for use by children in the household (the so-called "teenager" line) or because a customer has a modem or a fax terminating a separate line so that the customer does not to tie-up the first line for long periods.

In another aspect of the present invention, it is supposed that location 110 is the work location of party 115, location 130 is party's 115 home premises, and party 125 at location 120 is someone whose identity party 115 desires to keep in confidence, that is, party 115 does not wish to have the telephone number (408-464-2000) of party 125 appear on any telephone log for the originating telephone number (201-386-1000); party 125 may be, for example, party's 115 doctor or lawyer. In accordance with the technique described above, the only number that will appear on the telephone log of party 115 at location 110 will be the home telephone number of party 115 because party 115 initiates call set-up by controller 132 by placing a call to the secondary telephone number assigned to location 130, i.e., telephone number 908-582-4000. In turn, the call back to party 115 and the call to party 125 are listed only in the telephone log of telephone numbers 908-582-4000 and 908-582-3000, respectively.

Figure 2:
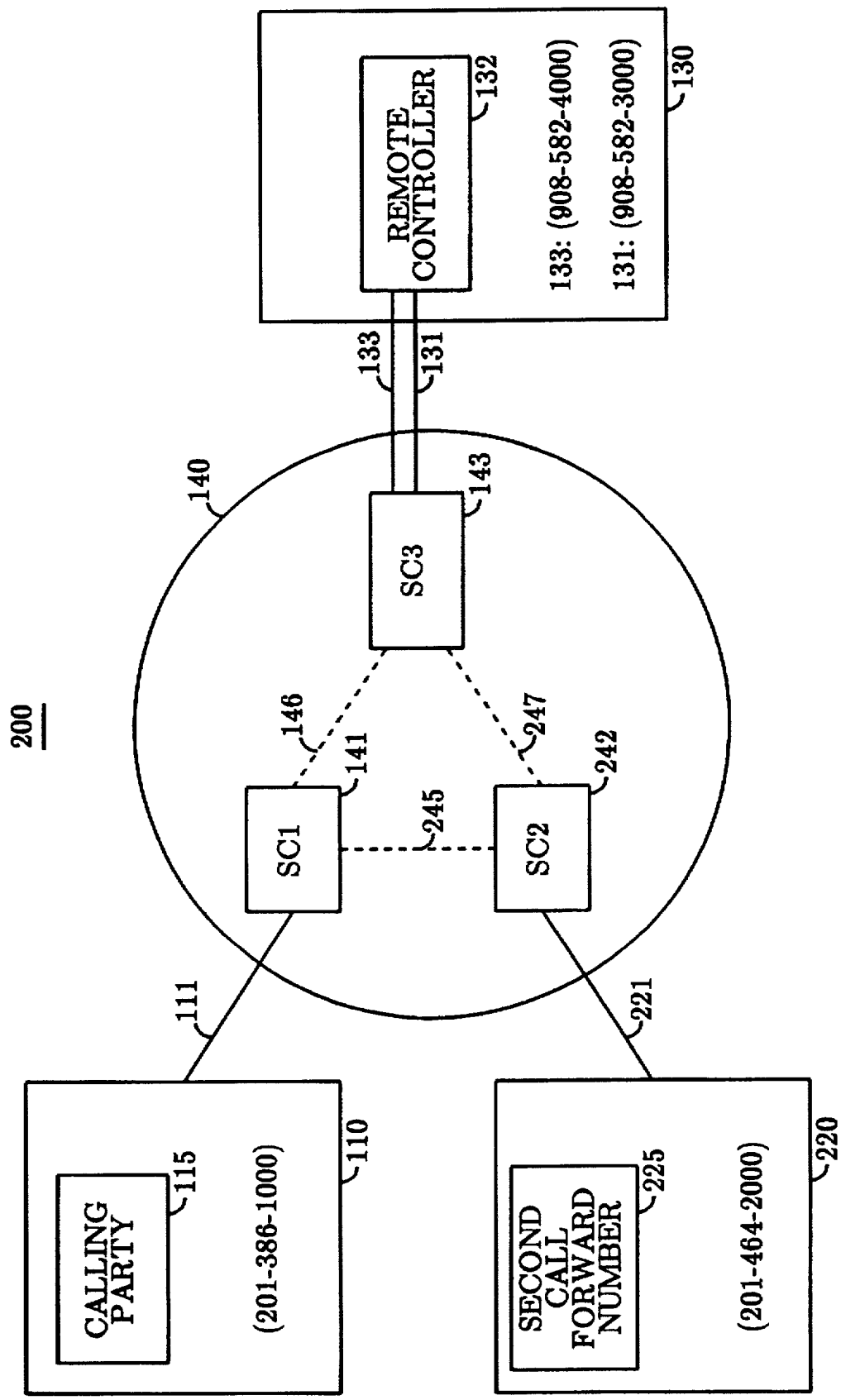
FIG. 2 illustrates another high-level block diagram of the telephone loop switching controller to control a first subscriber loop remotely over a second subscriber loop in accordance with another aspect of the present invention.

By way of illustrating another heretofore unavailable service, reference is made to the high-level block diagram 200 of FIG. 2. With respect to FIG. 2, it is assumed that the telephone number assigned to calling location 110 (i.e., 201-386-1000) is a call forwarding number for a call originally placed to telephone number 908-582-3000 assigned to location 130. That is, any call incoming to original number 908-582-3000 is re-directed, via the call forwarding service provided by switching center 143 (SC3), to telephone number 201-386-1000. Such re-direction is typically effected by a party at location 130, having assigned telephone number 908-582-3000, invoking the call forwarding code at location 130 (e.g., by keying-in *72), and then following a protocol leading to the keying-in of the call forwarding number 201-386-1000. Suppose further that the party originally keying-in the information at location 130, and who is the owner of the two numbers assigned to location 130 (i.e., 908-582-3000 and 908-582-4000) has traveled to location 110 and is now identified as party 115. In this situation, the party normally associated with location 130 invoked the call forwarding service knowing that he/she would be temporarily be at location 110 and he/she wishes to respond to calls incoming to location 130.

If party 115 now desires to leave location 110 and travel to location 220, there presently is no existing service which will allow party 115 to cancel call forwarding to telephone number 201-386-1000 and re-direct calls incoming to 908-582-3000 to 201-464-2000 at location 220. With controller 132 arranged as described below and two incoming loops to controller 132, namely, loops 131 and 133, such a service is readily provided. Initially, calling party, while at location 110 and before leaving for the new location 220, places a call to secondary telephone number 908-582-4000 at location 130 via telephone number 201-386-1000 from location 110. Controller 132 is arranged to operate generally according to the following steps:

(a) in response to the incoming call over loop 133 having assigned telephone number 908-582-4000, establishing a call connection with calling party 115 (that is, calling party 115 "keys-in" 1-908-582-4000 from location 110, thereby interconnecting party 115 to remote controller 132 via loop 111, LATA path 146 linking switching centers 141 and 143, and loop 133);

(b) drawing dial tone over the primary loop 131 upon establishing the call connection;

(c) bridging loops 131 and 133;

(d) upon establishing a bridged connection between the two incoming loops, party 115 transmits control information to be carried in an outgoing direction over loop 131 (such as first keying-in the call forwarding cancel code (*73), followed by re-invoking of the call forwarding code (*72), followed by responses to the call forwarding protocol to re-direct calls to 201-464-2000 (party 225 at location 220), as accessed via loop 221 homing on serving center 242); and (e) upon termination of the bridged call, controller 132 automatically resets to accept another incoming call.

Whereas the above has been described in terms of immediately drawing dial tone on the primary loop (step (b) above), it is possible to arrange controller 132 with a menu of operations which may be remotely selected. When so arranged, the remotely calling party is first provided with this menu of operations, which may be provided and/or made accessible in any number of standard formats. For example, a synthesized voice may request that the party calling over the secondary loop: "press the 1 key if a call-back is desired" (followed, of course, by a secondary menu which could signal for the call back number only, or a call back number as well as another calling number as per the description of FIG. 1); "press the 2 key if an immediate dial tone on the primary loop is desired" (as per the description of FIG. 2); and so forth. It is noted that with such a menu of operations, a menu of sub-operations may be associated with each of the operations. Thus, as in the second case above, once the 2-key is struck, the sub-operation of drawing dial tone on the primary loop is immediately invoked.

According to this arrangement wherein controller 132 is implemented with a menu of operations, controller 132 would generally operate according to the following steps:

(a) in response to an incoming calling on the secondary loop 133 from a calling party (e.g., party 115), establishing a call connection over the secondary loop 133 via controller 132 between the calling party and controller 132 (via loop 133, SC3 and SC1 and path 146, and loop 111);

(b) providing a menu of selectable operations accessible to the calling party via controller 132;

(c) remotely selecting one of the menu operations by the calling party, each of the menu operations defining at least one sub-operation to be carried out via the primary subscriber loop 131;

(d) controlling the primary subscriber loop 131 via controller 132 in response to the at least one sub-operation corresponding to the selected one of the operations, and (e) bridging the primary and secondary subscriber loops 131 and 133 to form a bridged connection so as to allow the calling party to monitor the primary loop 131 and, whenever required, to provide information to the primary loop 131.

As is readily apparent in the foregoing overview descriptions of various embodiments of the present invention, controller 132 may be characterized as a remotely-controlled mini-switching/bridging center, located on a individual customer premises, which advantageously utilizes two incoming loops to foster new telephony services not implementable from a centralized switching center such as SC1, SC2, or SC3. Moreover, with the advent of the ISDN connecting a customer premises with a central switching office, it is no longer required that the customer lease two loops; rather, the two B channels of ISDN may serve the same function as the two separate loops, and bridging may be effected digitally. Accordingly, wherein the descriptions of the various embodiments focuses on two individual loops, those with ordinary skill in the art may readily contemplate how the inventive services may be implemented using ISDN technology.

Illustrative Embodiment of One Aspect of the Present Invention

Figure 3:
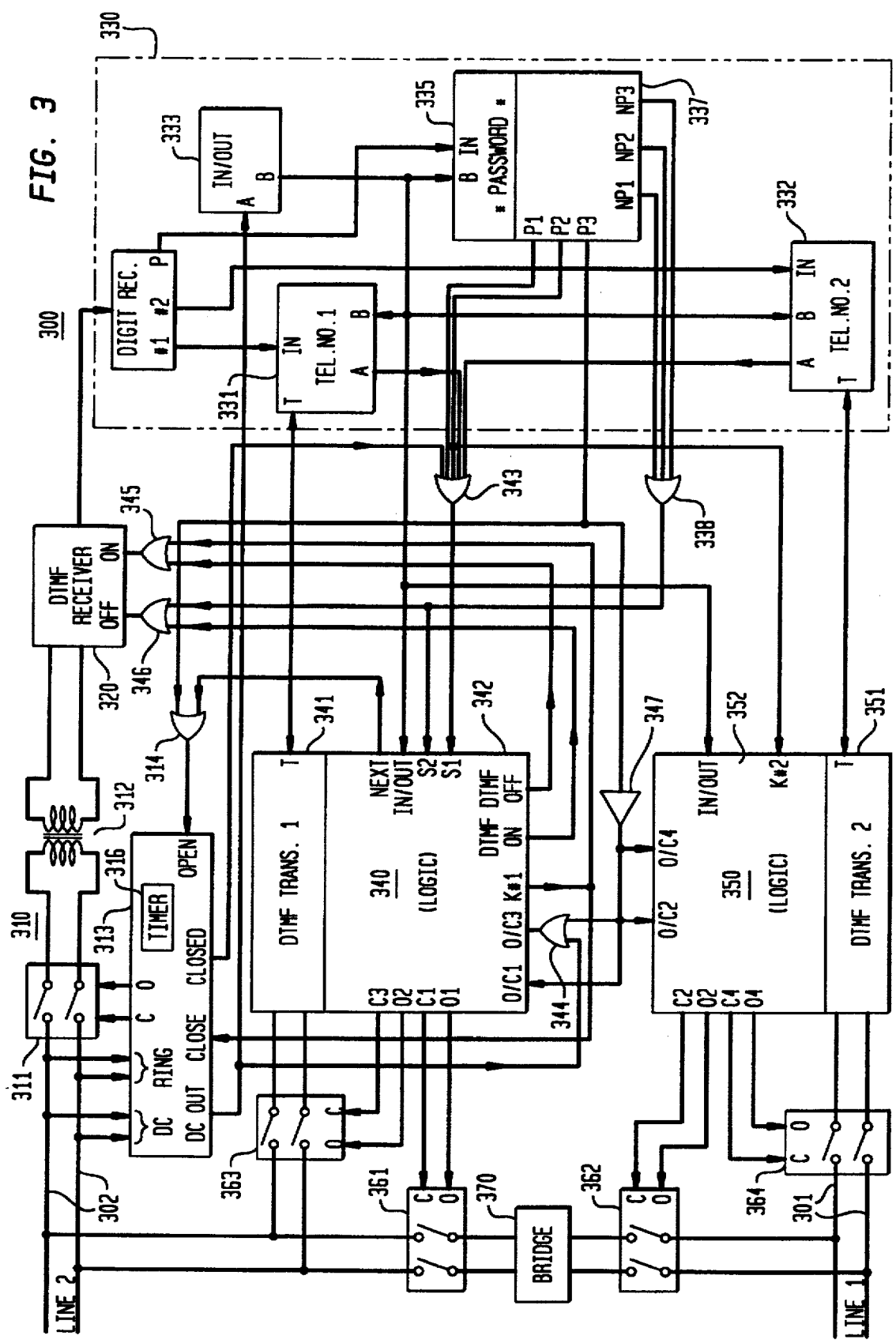
FIG. 3 is a block diagram of an illustrative embodiment of a controller which uses the two separate loops corresponding to the arrangement of FIG. 1.

With reference to FIG. 3, there is shown, in electrical block diagram form, MAnaginG Incoming Call (MAGIC) controller 300 connected to two separate incoming telephone lines. Telephone subscriber lines 301 and 302 are conventional loops that are connected to a conventional telephone central office (not shown) which offers standard "touch-tone" calling. To provide an operational description as well as a circuit description of controller 300, the operation of the components is described in one illustrative communication sequence as an incoming call arrives on line 302 (Line 2) from the calling party (such as party 115 in FIG. 1) so as to set-up and use controller 300. Other variations of the sequence are readily understood by one of ordinary skill in the art once the teachings and suggestions of the circuitry of FIG. 3 are comprehended.

Processor 330 of controller 300 has two operational states, namely, (a) an IN mode wherein the two telephone numbers are received from a calling party and stored for later use, and (b) an OUT mode wherein individual calls are placed to each of the two telephone numbers input by the calling party during the IN mode; processor 330 is initialized to the IN mode upon power-up to await an incoming telephone call. The IN/OUT mode register 333 provides a flag for the mode.

Line interface device 310 is composed of detection/logic circuitry 313 which detects the standard ringing signal appearing on line 302; the input from line 302 into circuitry 313 for ringing detection is provided by the RING port. When ringing is detected (typically after, say, 4–5 rings to allow a person at the location of the incoming call to answer any phone on line 302 in fewer rings to thereby override the controller and thus handle the incoming call as an ordinary call), logic 313 signals switch 311 to close via the C port of circuitry 313. When switch 311 closes, line 302 is effectively "answered" by providing the equivalent of an "off-hook" state, that is, line 302 is coupled through repeat coil 312 to DTMF (Dual-Tone, Multi-Frequency) receiver 320; receiver 320 is not yet activated to accept incoming digits keyed in by the calling party, but it will be activated shortly as discussed below. Initially, DTMF transmitter circuitry 340 is placed in a mode corresponding to the IN mode of register 333; this is accomplished by coupling the B port of register 333 to the IN/OUT port of DTMF circuitry 340. To initiate a process so as to inform the calling party that controller 300 is being activated to accept incoming digits, circuitry 313 sends a signal to DTMF circuitry 340, which is composed of DTMF transmitter 341 and logic circuitry 342, indicating that ringing has been detected and that switch 311 is closed; this initiation signal is emitted from the CLOSED port of circuitry 313 to DTMF circuitry 340 through OR gate 343 to the S1 port of logic 342. The first signal received on the S1 port while DTMF circuitry is in the IN mode causes two operations, namely, (a) closing of switch 363 via a signal sent from port C3 of logic circuitry 342; and (b) emitting an audible signal (such as a "beep" tone) by DTMF transmitter 341 onto line 302 via switch 363 to alert the calling party that controller 300 is ready to sequentially accept the two telephone numbers of interest. In this mode of operation, DTMF 341 need not draw "dial tone" (since coil 312 completes the DC path) so DTMF 341 may be AC-coupled to line 302. Once the audible signal is discontinued (typically the tone would be active for a predetermined interval of say 3 seconds), a signal emanating from the DTMF OFF port of circuitry 342 is transmitted to OR gate 345 and, in turn, to the ON port of DTMF receiver 320 to activate receiver 320.

The first number keyed in by the calling party is the party's so-called confirmation code, referred to as the PASSWORD. The PASSWORD begins and ends with the same delimiter, such as the "star" (*) key of a touch-tone key pad, and is stored in register 337 in processor 330. The PASSWORD assigned to the controller is selected off-line beforehand and can be provided and stored in any conventional manner such as, for example, by the setting of a bank of DIP switches (not shown). Presuming the set of digits keyed in by the calling party corresponds to the correct PASSWORD, then an audible signal (such as the beep tone again) is supplied to the calling party by sending an enable signal from the P1 port of logic 335 coupled to register 337 to OR gate 343 and, in turn, to the S1 port of logic 342. An audible signal alerts the calling party that controller 300 is ready to accept telephone number-type information. If the set of digits representative of the PASSWORD provided by the calling party has the proper beginning and ending delimiter, but the intermediate digits are not correct, then a second audible signal (such as an interrupted "beep" tone) could provide an indication to the calling party to try again after the second audible signal is removed. This action is initiated by passing a signal from the NP1 port to OR gate 338 and, in turn, port $2 of logic 342. During the interval of application of either the first or second audible signal, DTMF receiver 320 is turned OFF via a signal from the DTMF ON port of logic 342 and OR gate 346. DTMF receiver 320 is turned back on once either audible signal is removed via the DTMF OFF port and OR gate 345. If the proper password is not received within a predetermined interval, controller 300 is typically reset to its initial IN mode.

Assuming that the PASSWORD is received correctly, the calling party keys in the first telephone number, that is, the number assigned to the line presently utilized by the calling party to place the incoming call to controller 300. DTMF receiver 320 detects each individual digit and passes each digit to the DIGIT RECeive port of processor 330. Since this is the first set of digits received by processor 330 after the PASSWORD, the digits are passed to TELEPHONE NO. 1 memory device 331. In order to simply differentiate between local and long distance telephone numbers (7 digits versus 10 digits), the calling party ends the string of keyed-in digits with a delimiter, such as the "star" (*) symbol. Once device 331 receives the digits, the calling party is alerted to the reception and storage of the digits with the audible signal.

This signal is initiated by device 331 passing an enable signal from its A port to OR gate 343. The audible signal is emitted from DTMF transmitter 341 and passed through switch 363, which is still closed, to line 302. While the DTMF audible tone is present, DTMF receiver 320 is deactivated by a control signal passed from DTMF ON port of logic 342 to the OFF port of DTMF receiver 320; once audible tone is removed, then DTMF receiver 320 is reactivated by a signal passed from the DTMF OFF port of device 340 to the ON port of receiver 320. (As an option, not shown, the digits could be "voice synthesized" and repeated to the calling party to verify the correctness of the digits. If they are correct, a * key depression by the calling party could indicate this; if they are not correct, then a # key depression would allow register 331 to be reset to accept a new set of digits).

The calling party, upon momentarily hearing the audible signal, now keys in the digits representing the second telephone number, that is, the number of the called party. DTMF receiver 320 decodes each digit and passes the digits to the DIGIT REC port of processor 330. In turn, the digits are passed to TELEPHONE NO. 2 memory device 332. Once the digits stored in device 332 are determined as acceptable (the string of digits may again be delimited by *), a control signal is passed from the A port of device 332 to the S 1 port of logic 342 via OR gate 343. Again, an audible signal is emitted from DTMF transmitter 341 to the calling party on line 302. DTMF receiver 320 is turned off during the presence of the audible tone. In addition, since two telephone numbers have been received correctly, logic circuitry 342 opens switch 363 by passing a control signal from the O3 port of circuitry 341 to the O port of switch 363. Also, logic 342 prepares device 310 for the next mode (OUT) by signaling device 310 to open switch 311 by passing a signal from the NEXT port of logic 342 to OR gate 314 and, in turn, to the OPEN port of logic 313. The calling party also hangs up after hearing this last audible signal.

The normal processing by the local central office brings down the connection between the calling party and the controller once the calling party and controller "hang up", in effect. Once a Direct Current voltage signal is sensed on line 302 which is above a predetermined threshold in magnitude at the DC port of logic 313, thereby indicating that the "on-hook" state of controller 300 has been re-established, an enable signal is emitted from the DC OUT port of logic 313 to the A port of the IN/OUT mode register 333 and OR gate 344—gate 344 connects to the open/close port associated with switch 363 (O/C3 port). This enable signal causes mode register 333 to switch to the OUT mode, that is, the mode for keying out the two stored telephone numbers, and causes logic 342 to: close switch 363; provide a DC path to draw dial tone from the central office over line 302 as initiated by DTMF transmitter 341; and extract TELEPHONE NO. 1 from device 331 for use by DTMF transmitter 341 to initiate an outgoing call over line 302. In addition, when register 333 raises the OUT flag, a signal is sent from its B port to the B port of devices 331, 332, and 337 to prepare these devices for the keying out mode of operation. In this mode, the first expected response from the calling party when the party answers the first outgoing call is the PASSWORD, so device 337 is activated. Also, TELEPHONE NO. 1 is passed between device 331 and transmitter 341 over their respective T ports.

Once TELEPHONE NO. 1 has been keyed out, detection device 310 is reactivated to close switch 311 by passing an activation signal from the K#1 port of device 342 to the CLOSE port of device 310, and DTMF receiver 320 is turned on via its ON port coupled to OR gate 345. (In this mode, coil 312 can be AC-coupled to line 302 since DTMF transmitter 341 employs a DC path to draw dialtone). Controller 300 is notified that the first party (the original calling party) has answered the outgoing call by the receipt of a string of digits representing the calling party's PASSWORD.

Presuming the set of digits keyed in by the first party upon answering the call back is the correct PASSWORD, then an audible signal (such as a beep tone) is supplied to the first party by sending an enable signal from the P2 port of logic 335. This alerts the first party that the second party will now to be called. If the set of digits representative of the PASSWORD has the proper beginning and ending delimiter, but the digits are not correct, then a second audible signal (such as an interrupted "beep" tone) would provide an indication to the first called party to try the PASSWORD again after the second audible signal is removed. This action is initiated by passing a signal from the NP2 port to OR gate 338 and, in turn, port S2 of logic 342. During the interval of application of the second audible signal, DTMF receiver 320 is turned OFF via OR gate 346. This action continues until the correct PASSWORD is received or a time-out occurs—if a time-out occurs, then controller 300 is completely reset.

Figure 6:
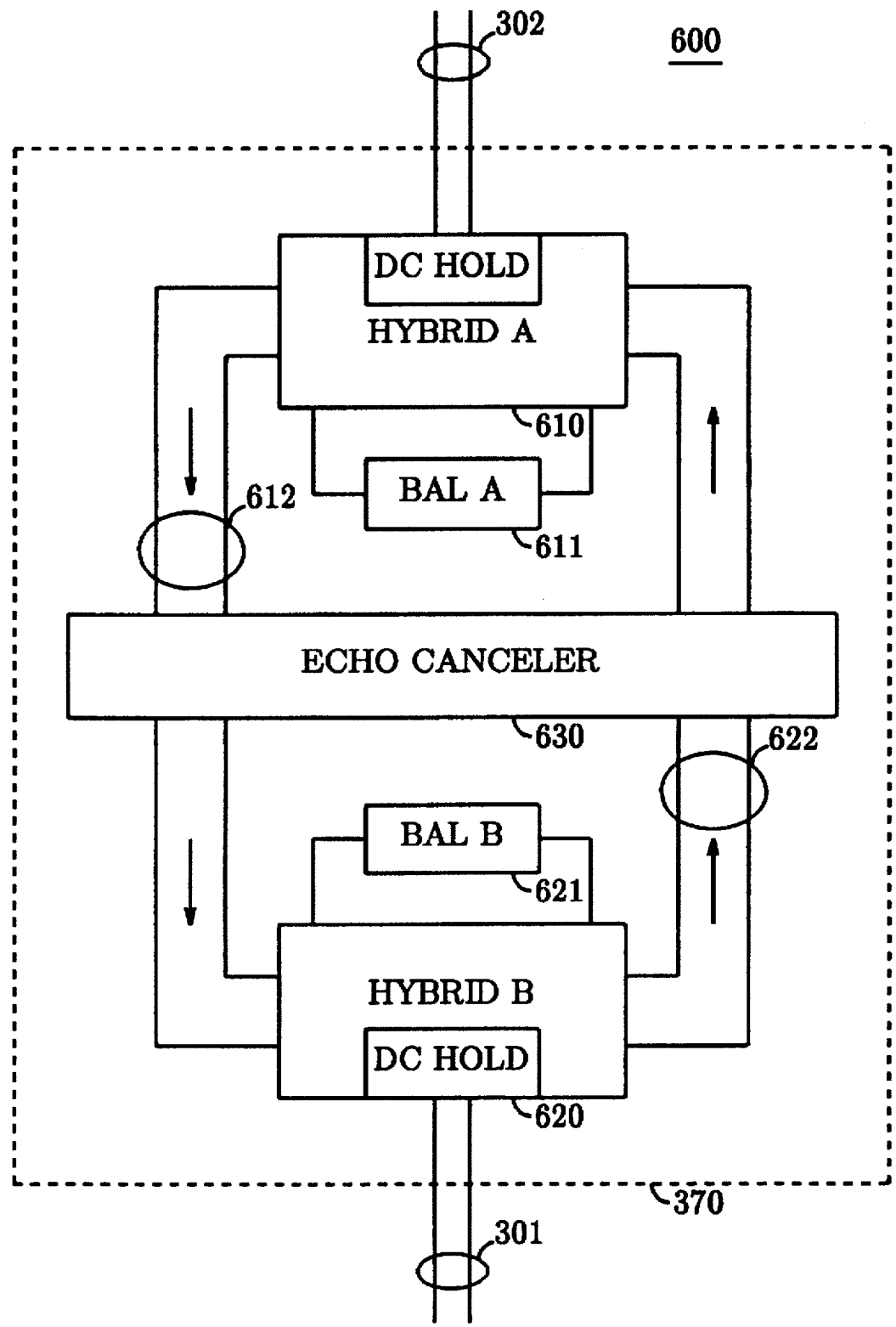
FIG. 6 is a block diagram for an illustrative bridging network depicted in FIG. 3.

The correct PASSWORD enables logic 342 to both close switch 361 and open switch 363. Switch 361 is connected to bridge 370 which serves the function of interconnecting lines 301 and 302 once both the first and second calls have been answered. Bridge 370 is a conventional device that couples a telephone-type receiver associated with line 302 to a telephone-type transmitter associated with line 301, and also couples a telephone-type receiver associated with line 301 to a telephone-type transmitter associated with line 302—such a bridge may be configured with hybrid networks that implement two-to-four wire conversion, and appropriate balancing networks. Bridge 370 is also arranged with DC paths at both ports to hold any connection that has been established. A block diagram of an illustrative bridge is shown in FIG. 6.

Presuming the called party has answered the incoming call at the remote location, and supplied the PASSWORD, DTMF transmitter 352 receives an enable signal to key-out the second telephone number; this enable signal is received by the K#2 port from the P2 port of logic 335. The enable signal causes logic 352 to close switch 364, DTMF transmitter 351 to draw dial tone, and then transmitter 351 keys TELEPHONE NO. 2 onto line 301 (Line 1). After the second party has been called, logic 352 causes switch 362 to close, via the C2 port, and switch 364 to open, via the O4 port. At this point in the operation, the first party can hear the ringing signal being applied to alert the second party at their remote location.

Assuming the second party answers the phone, the conversation between the parties may commence immediately via the bridge 370, which holds the DC connections of lines 301 and 302, and which also AC-couples the speech path of each party. DTMF receiver 320 stays activated to await touch-tone signals. When the conversation is complete, the second party is instructed to hang up their handset. The first party then keys in the PASSWORD which now acts as a disconnect signal. PASSWORD device 337 remains active to receive the keyed-in set of digits. If there is a match, then a signal emitted on port P3 of logic 335 enables both logic devices 342 and 352 to open all switches, namely, switches 361-364, via the O1-O4 ports, respectively. If the PASSWORD is not correct, the first party is alerted to resubmit the PASSWORD by enabling port S2 of logic 342 via OR gate 338 and the NP3 port of logic 335 to ensure that the first party truly desires to tear down the connection. The enable signal on port P3 of logic 335 also is passed to the OPEN port on interface 310, via OR gate 314, to cause the opening of switch 311 and thereby the decoupling of DTMF receiver 320 from line 302.

If the second party does not answer the phone, the first party may signal their desire to disconnect by keying in the PASSWORD. Detection of the PASSWORD causes an enable signal to issue on port P3 of logic 335, again causing all switches 361-364 to open, as well as switch 311, as was describe above in detail.

Figure 4:
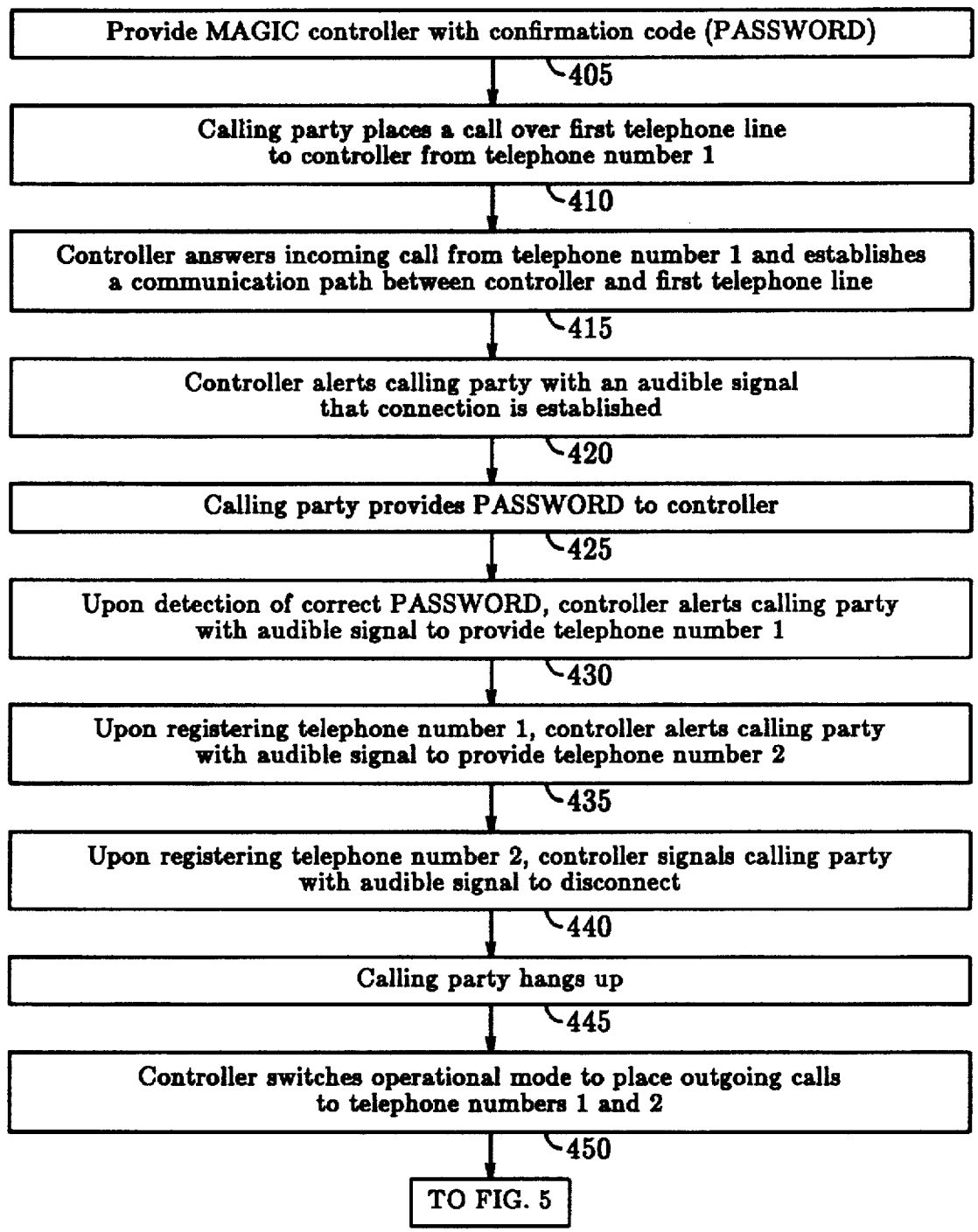
FIGS. 4 and 5 depict a flow diagram representative of the operation of the circuitry of FIG. 3.
Figure 5:
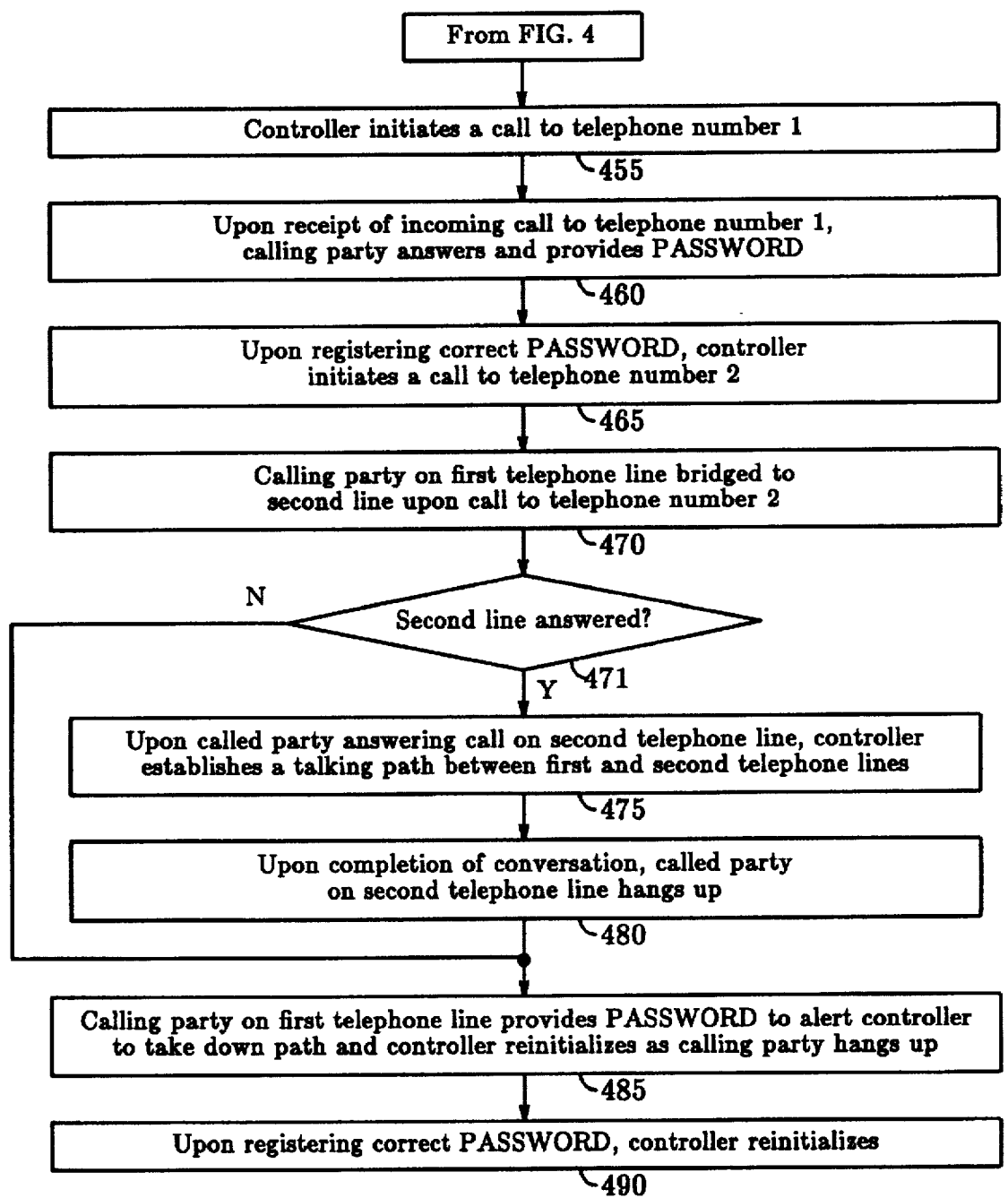

Flow diagram 400, encompassing both FIGS. 4 and 5, provides a succinct summary of steps of the process for the two separate outgoing lines presuming that a confirmation code has initially been input and stored in controller (block 405):

1. call to MAnaginG Incoming Call (MAGIC) controller (controller) from a first telephone number by first or calling party (block 410) which establishes a connection with the calling party (block 415) and sends a signal indicative of this established connection (block 420);

2. first party keys-in a confirmation code (PASSWORD), and upon correct code, controller is activated to receive telephone numbers (block 425) and sends signal indicative of this activation (block 430);

3. first party keys-in the first telephone number for detection by the controller, which is presumed to be connected to a serving switching center or local central office offering conventional touch-tone calling (block 435);

4. the controller stores first telephone number and signals first party to enter a second telephone number of a second party to be called or called party (block 435);

5. first party keys-in the second telephone number (block 435);

6. the controller stores the second telephone number (block 440)

7. the first party terminates the original call such as by hanging up the handset (block 445) and the controller switches operational mode (block 450);

8. the controller initiates a first outgoing telephone call to the first telephone number by drawing dial tone on the first line and "touch-toning" the first telephone number for processing by the serving switching center (block 455);

9. the first party answers the incoming call to the first telephone number and keys-in a confirmation code (block 460);

10. the controller detects that the outgoing telephone call has been answered by the proper first party by sensing the transmitted confirmation code (block 465);

11. the controller initiates a second outgoing call to the second telephone number by drawing dial tone on the second line and "touch-toning" the second telephone number for processing by the serving switching center (block 470);

12. the controller bridges the second outgoing call to the first party so the first party may listen to the ring-back signal from the second outgoing call (block 470);

13. if the second party answers the second outgoing call, the first party and second party may immediately begin conversation since the parties are already bridged (block 475);

14. if the second party does not answer the second outgoing call within an expected time interval, the first party signals the controller to drop both connections by keying-in the confirmation code (block 472);

15. whenever the first party and second party finish communicating, the second party drops off the connection such as by hanging up the telephone handset associated with the second telephone number (block 480);

16. the first party signals the controller to drop the connection to the first party by keying-in the confirmation code (block 485); and 17. the controller monitors the bridged call for the confirmation code and, upon receipt of such a code, disconnects the controller from the third-party call such as performing a function equivalent to hanging up a telephone instrument associated with the controller (block 490).

The block diagram 600 of FIG. 6 illustrates an embodiment of bridge 370 shown in FIG. 3. In FIG. 6, incoming line 301 connects to hybrid 610. Hybrid 610 has at its input a DC hold path, and balancing network 611 couples to hybrid 610 to mitigate trans-hybrid transmission. Similarly, incoming line 302 connects to hybrid 620. Hybrid 620 has at its input a DC hold path, and balancing network 621 couples to hybrid 620 to mitigate trans-hybrid transmission. Echo canoelet 630 reduces the trans-hybrid transmission that balancing networks 611 and 612 cannot completely eliminate. The arrangement of FIG. 6 is a typical 2–4 wire coupling arrangement well-known in telephony Of course, other arrangements may be contemplated by one of ordinary skill in the art given the functionality that is desired, namely, to bridge lines 301 and 302 for two-way or bi-directional conversation.

Figure 7:
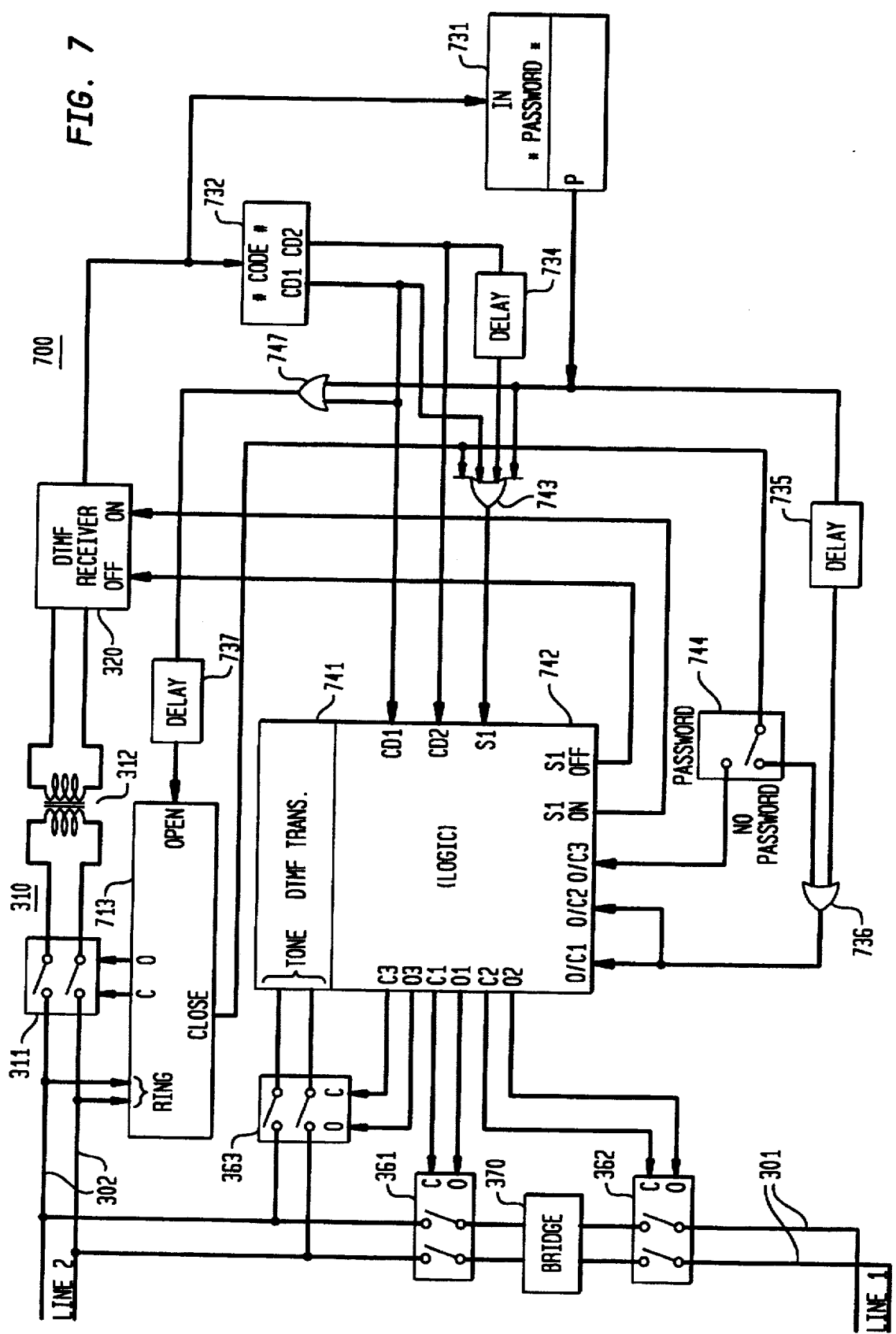
FIG. 7 is a block diagram of an illustrative embodiment of the controller which uses the two separate loops corresponding to the arrangement of FIG. 2.

Now with reference to FIG. 7, there is shown circuitry 700 encompassed by MAGIC controller 132 which implements direct access to the first loop in response to an incoming call on the second loop, as described in detail below. The arrangement of FIG. 7 may be thought of as a second service of controller 132, whereas the arrangement of FIG. 3 is a first service. Accordingly, elements common to FIGS. 3 and 7 are referred to using the same reference numeral.

One function of circuitry 700 is to automatically draw dial tone on loop 301 (the primary loop or first loop) upon a call connection to an incoming call on loop 302 (the secondary or second loop), and then bridge loops 301 and 302 so that the incoming calling party on loop 302 may provide control information to loop 301.

To accomplish this function, line interface device 310 is composed of detection/logic circuitry 713 which detects the standard ringing signal appearing on line 302; the input from line 302 into circuitry 713 for ringing detection is provided by the RING port. When ringing is detected (typically after, say, 4–5 rings to allow a person at the location of the incoming call to answer any phone on line 302 in fewer rings to thereby override the controller and thus handle the incoming call as an ordinary call), logic 713 signals switch 311 to close via the C port of circuitry 713. When switch 311 closes, line 302 is effectively "answered" by providing the equivalent of an "off-hook" state, that is, line 302 is coupled through repeat coil 312 to DTMF (Dual-Tone, Multi-Frequency) receiver 320; receiver 320 is in the ON state at start-up. Moreover, upon an indication that ringing has been detected, an control signal is emitted from the CLOSED port of circuitry 713 and is passed to switching device 744. If device 744 is set in the NO-PASSWORD position (as shown), then this control signal serves as an input to both the O/C1 and O/C2 ports of logic circuitry 742 associated with DTMF transmitter 741. Switches 361 and 362 are initially open so that the signal to O/C1 and O/C2 causes both switches to close.

Switch 361 couples loop 302 to bridge 370, whereas switch 362 couples loop 301 to bridge 370. Bridge 370 is assumed to contain a DC hold path, so the closure of switch 362 causes loop 301 to draw dial tone from the central switching office serving loop 301. Because loop 302 is bridged to loop 301, the party calling in on loop 301 may monitor the progress of loop 302, such as by hearing the dial tone as it is drawn by loop 301. This is an indication to the calling party that control information may now be provided to loop 301 via the touch-tone key-pay at the calling party's location. One activity of the calling party is to key-in a number of a called party to the central switching office as if the calling party were placing a call from the location of controller 700—except that the control is in reality coming from a remote location over loop 302. Presuming that the called party answers, then both the calling party and called party may converse via the coupling effected by bridge 370.

After the conversation is completed, the calling party may control the disconnection of both calls over loops 301 and 302 by keying in a so-called security code or password code. The keyed in code is typically arranged as a series of alphanumeric characters from a standard telephone keypay, preceded by and followed by, for example, the special character "*". DTMF receiver 320 detects each arriving alphanumeric character and passes each character in series to password logic 731. Logic 731 is a serial input, parallel output device that compares the incoming stream of characters with a stored password code (such code is pre-loaded into controller 700 by the calling pasty, such as by setting DIP switches (not shown)). When the password code is detected, a signal is emitted from the P port of circuitry 731. This signal is delayed by delay device 735 for a predetermined time (say 7 seconds), and then passed to the O/C1 and O/C2 ports of logic 742 via OR-gate 736. The signal into the O/C1 and O/C2 ports causes switches 361 and 362 to open, the latter removing the DC hold path from loop 301. To remove the DC hold path from loop 302, the signal from the P port of circuitry 731 is also passed to the OPEN port of logic 713 via OR-gate 747 and delay device 737 to thereby open switch 311. The DC hold path is thus removed from loop 302. The central office processes both calls as hangups and resets the states of the loops and controller 700 to again await either an incoming call or an outgoing call.

It may be desirable to first verify that the calling party is authorized to proceed with a call out on loop 301, so circuitry 700 also encompasses such an arrangement. It is assumed that controller 700 has been initialized and that switch 744 is presumed to be set in the PASSWORD position. As before, an incoming call over loop 302 is coupled to circuitry 713 via its RING port. When ringing is detected, logic 713 signals switch 311 to close via the C port of circuitry 713. When switch 311 closes, line 302 is effectively "answered" by providing the equivalent of an "off-hook" state, that is, line 302 is coupled through repeat coil 312 to DTMF receiver 320; receiver 320 is in the OFF state at start-up. Moreover, upon an indication that ringing has been detected, a control signal is emitted from the CLOSED port of circuitry 713 and is passed both to the O/C3 port of logic circuitry 742 via switch 744 and to the S 1 port of logic circuitry 742 via OR-gate 743. Switch 363 is initially open so that the signal to O/C3 causes the switch to close, thereby coupling DTMF transmitter 741 to loop 302.

To inform the calling party that circuitry 700 is being activated to accept the security code, the signal arriving on the S 1 port of logic 742 causes DTMF transmitter 741 to emit an audible signal (such as a "beep tone") via switch 363 to loop 302. This alerts the calling party that controller 700 has been activated to receiver the password code. DTMF 741 need not draw "dial tone" (since coil 312 completes the DC path) so DTMF 741 may be AC-coupled to line 302. Once the audible signal is discontinued (typically the tone would be active for a predetermined interval of say 3 seconds), the calling party may input the password code.

The first number keyed in by the calling party is the party's security/password code. As before, the password code begins and ends with the same delimiter, such as the "star" (*) key of a touch-tone key pad. The incoming stream of characters is passed to logic circuitry 731, which is arranged as a serial-in, parallel-out device. If the password code matches the pre-loaded code (e.g., DIP switches), a signal is emitted by the P port of logic 731 to the S1 port of logic 742 via OR-gate 743, as well as to the O/C1 and O/C2 ports of logic 742 via delay device 735 in series with OR-gate 736. The signal at the S1 port causes another short audible signal to be transmitted to loop 302, thereby indicating to the calling party that the password has been identified and the controller will be activated to accept control information from the calling party. The activation of switches 361 and 362 occurs after S1 has been removed from loop 302 due to the delay of device 735.

Because of the activation of switches 361 and 362, loop 301 is coupled to loop 302 via bridge 370. The closing of switch 362 causes loop 302 to draw dial tone, and the calling party can monitor the call progression on loop 301. For instance, once dial tone is heard, the calling party may provide control information from loop 302 to loop 301 and, in turn, to the serving central office. One type of control information is the telephone number of a called party. If the serving central office provides a "speed dial" service, another type of control information that can be provided is the speed dial code. Another type of control information may be provided if the serving central office offers "call forwarding" service; the call forwarding may be activated via the standard protocol as if the calling party was located at the premises wherein controller 700 is located. Another type of control information is that of providing loop 301 with a series of key-stroke inputs to cancel call forwarding, re-activate call forwarding, and then enter another telephone number to which incoming calls to loop 301 are to be call forwarded.

The calling party also controls the taken down of the call connection on loop 301, if any, as well as the call connection on loop 302 via various special codes. For example, one code may call for taking down both loops 301 and 302 from their respective serving central offices; another code may call for taking down loop 301 for a momentary interval, and re-drawing dial tone on loop 301 so the calling party may issue another round of control information. The special codes may be a series of alphanumeric characters set off between a special delimiter (e.g., "#"). As a example of taking down both connections, suppose the appropriate pre-loaded code is received over loop 302 upon the completion of a conversation between the bridged parties; such code is designated as CD1 in FIG. 7, and is derived from serial-in, parallel-out logic device 732. Upon an indication of the receipt of CD 1, a signal is transmitted to port S 1 of circuitry 742 via OR-gate 743 and to port CD1 of circuitry 742. A signal on the S1 port causes a "beep tone" to the calling party to indicate the correct reception of CD 1. After a brief interval (such as a few seconds), logic circuit 742 emits an "open" signal to switches 361, 362, and 363 as a result of the signal received an input port CD1. In addition, a CD1 signal is sent to the OPEN port of logic 713 via OR-gate 747 and delay device 737—the delay allows a timed interval before switch 311 is opened to completely remove the DC hold on loop 302.

If a CD2 special code is received from the calling party, indicating that loop 301 is to be disconnected momentarily, a signal is emitted from the CD2 port of serial-in, parallel-out device 732. This signal is delivered to the S 1 port of device 742 via delay device 734 and OR-gate 743, and to the CD2 port of device 742. Receipt of the signal on the CD2 port causes switch 362 to open for a predetermined interval, and then to close again. The delay in the signal from CD2 to S1 is to allow switch 362 to open before the "beep tone" is placed on loop 302 (thereby precluding the "beep tone" from inadvertent signaling the serving central office of loop 301); the "beep tone" alerts the calling part to the successful reception of CD2.

Figure 8:
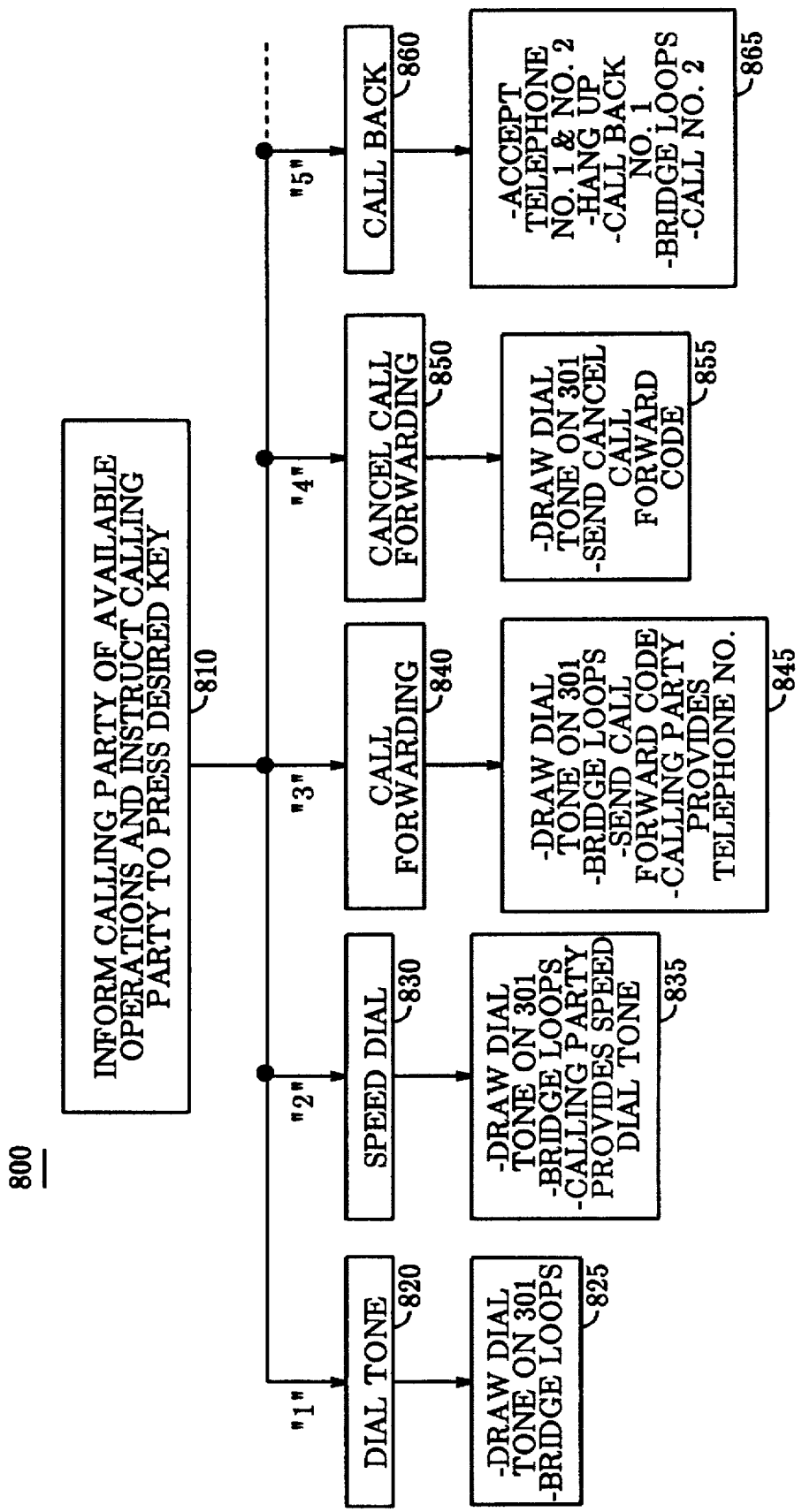
FIG. 8 is a flow diagram of an illustrative embodiment of remote access to a menu of selectable operations which, in turn, control the primary loop.

The embodiment of FIG. 7 has carried out, in effect, a menu of operations accessible to the calling party. It is readily contemplated by those of ordinary skill in the art that a menu of operations, such as exemplified by CD1 and CD2, but carried out by the calling party directly, could be provided to the calling party immediately after verification of the password code. Examples of such menu items are: speed dial; cancel call forwarding; call forwarding; cancel call forwarding and re-input another call forwarding number; and so forth. Each menu item will normally have a set of sub-operations corresponding to each menu operation. For instance, for the speed dial operation, two sub-operations are expected, namely, draw dial tone on loop 301 and then enter the speed dial code upon receipt of dial tone on loop 301. The flow diagram 800 of FIG. 8 depicts the flow of such a menu of operations and sub-operations. As depicted by block 810, the calling party is informed of the various operations and then instructed to press the appropriate key for the desired operation. For instance, "press key 1" selects menu item "dial tone" as depicted by block 820 and invokes the sub-operations of drawing dial tone over loop 301 and bridging loops 301 and 302, as depicted by block 825. "Press key 2" selects menu item "speed dial" (block 830) and invokes the sub-operations of drawing dial tone over loop 301 and bridging loops 301 and 302, as well as sending the speed dial code over loop 301 (block 835) by the calling party. "Press key 3" selects menu item "call forward" (block 840) and invokes the sub-operations of drawing dial tone over loop 301 and bridging loops 301 and 302, as well as sending the call forward code over loop 301, and then awaiting the call forwarding telephone number from the calling party (block 845). "Press key 4" selects menu item "cancel call forwarding" (block 850) and invokes the sub-operations of drawing dial tone over loop 301 and bridging loops 301 and 302 (optional), as well as sending the cancel call forwarding code over loop 301 (block 855). "Press key 5" selects menu item "call back" (block 860) and invokes the sub-operations of accepting two telephone numbers, dropping the connection to the calling party, calling telephone number 1 over loop 302, calling telephone number 2 over loop 301, and bridging the loops 301 and 302. Obviously, other menu items may be added that are within the spirit and scope of the present invention.

Figure 9:
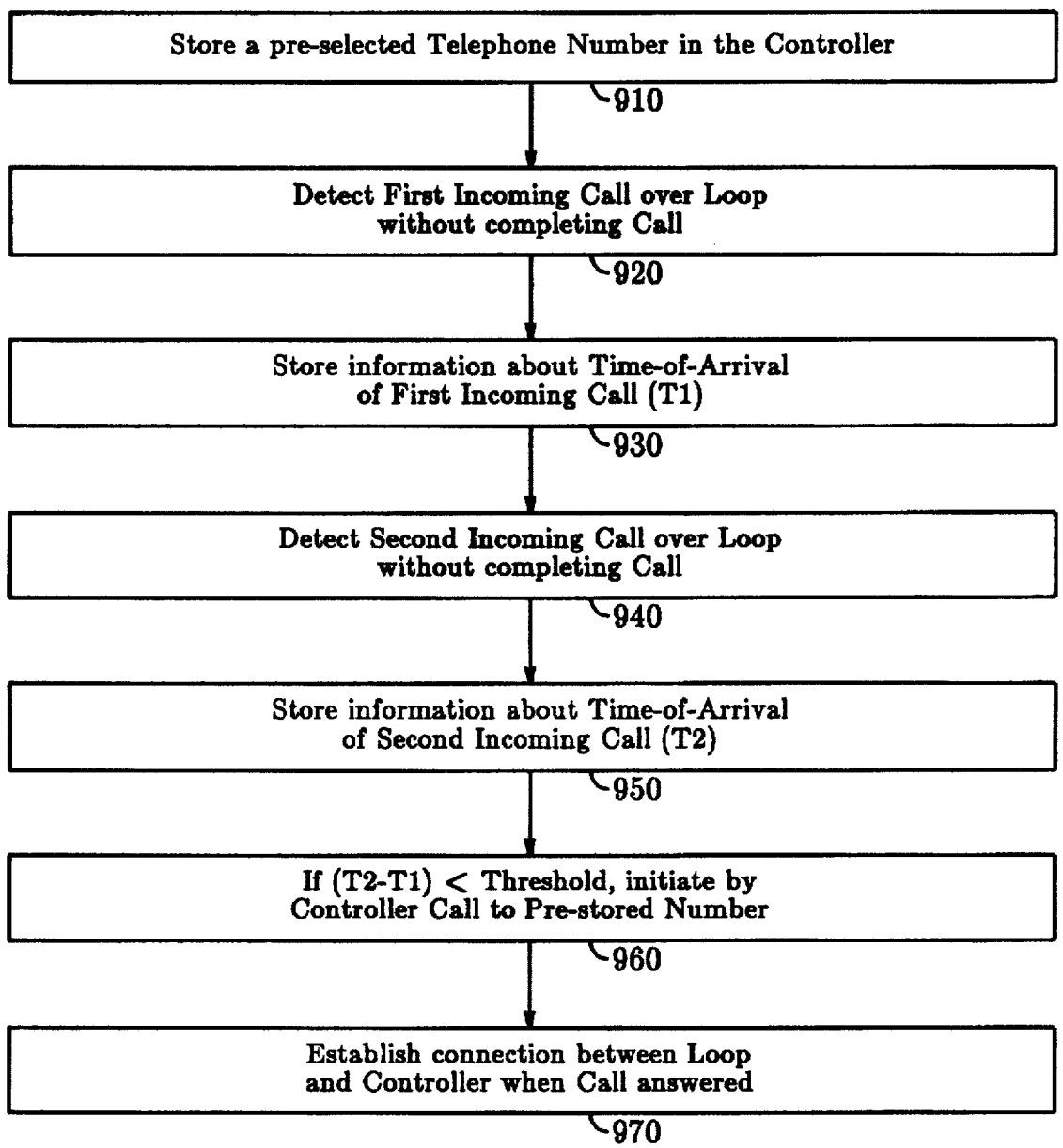
FIG. 9 is a flow diagram for call back by the controller to a specified number after two ringing signals have been received in a predetermined interval.

In yet another embodiment of the present invention, the controller as manifested in either FIG. 3 or FIG. 7 may be arranged to call back a stored telephone number after two separate ringing signals are detected, but not answered, over the incoming secondary loop—this is a variation on the so-called "toll saver" option wherein an answering machine picks up after only, say, two tings if there are messages, but answers only after, say, four tings if there are no messages. This way the calling party can hang-up before the answering machine completes the call since the calling party knows no messages are waiting whenever the answering machine does not pick up by the third ting. In the double-call situation, the calling party wishes to invoke the controller remotely and similarly does not wish to pay for answered calls by the controller. Two calls closely spaced alert the controller to call back the stored telephone number, such as a cellular phone—a completed call to a cellular phone generally costs less than a completed call from a cellular phone; more importantly, two uncompleted calls from a cellular phone typically have no associated charges. A flow diagram 900 of the toll-saver arrangement in accordance with the present invention is shown in FIG. 9. In FIG. 9, block 910 represents the step of storing a pre-selected telephone number in the controller. Next, as depicted by blocks 920–950, the time of arrival of two sequential incoming calls, as manifested by a tinging signal, are detected by and stored in the controller. As block 960 depicts, if the time difference between the time of arrival of the two calls is less than a pre-determined value, then an outgoing call is initiated over the secondary loop using the stored telephone number. Finally, as indicated by block 970, a call connection is established between the loop and controller whenever the outgoing call is answered.

The toll saver arrangement may be carried out, for example, by timer 316 of FIG. 3, which is part of logic 313. Timer 316 is coupled to the RING port, and can be initiated on the first ringing signal, and times out if a second ringing signal does not arrive within a pre-set time interval. The stored telephone number may also be stored in register 331 of processor 330 as a default and is accessed and delivered to DTMF 341 in essentially the same manner as TELEPHONE NO. 1.

Once a call connection is established, the party responding to call placed to the pre-stored telephone number can be provided a menu of operations, as described in detail above. Or, in a simplified version of the arrangement, dial tone can be drawn on the primary loop and the party reached via the pre-stored telephone location may then provide control information over the primary loop.

Thus, there are other possible embodiments and/or configurations that are readily contemplated by one of ordinary skill in the art with respect to the various illustrative embodiments of the inventive controller; these include:

1. first telephone number already stored in the controller - such as the first party's work telephone number;

2. first party is called back prior to keying-in the second telephone number so that the first party may directly provide the second telephone number;

3. the controller "repeats" each telephone number such as by voice synthesis to first party and requests confirmation from first party before storing each telephone number;

4. the first party maintains control of the initial hang-up by providing a confirmation code to initiate taking down of the connection while the controller is in the IN mode;

5. the MAGIC controller can be programmed to call back the first or calling party a number of times in case the first telephone line is put in use from the time of initial hang-up to the call back;

6. only one DTMF transmitter is required and it may be time-shared;

7. the service outlined above is envisioned as also being an applique to effect an improved "answering machine"-type device—similar to providing a code to turn off the usual recorder answering message and retrieve the incoming recorded messages—only this new or second code re-directs the "answering machine" processing; and 8. it is also possible to envision such a service as being provided to a customer by a central switching center under control of the LEC. In this mode of operation, the first party could call a "special" number and could then key in the two telephone numbers to the local switch; the local switch would be arranged with a functionality equivalent in operation to controller 300.

Figure 10:
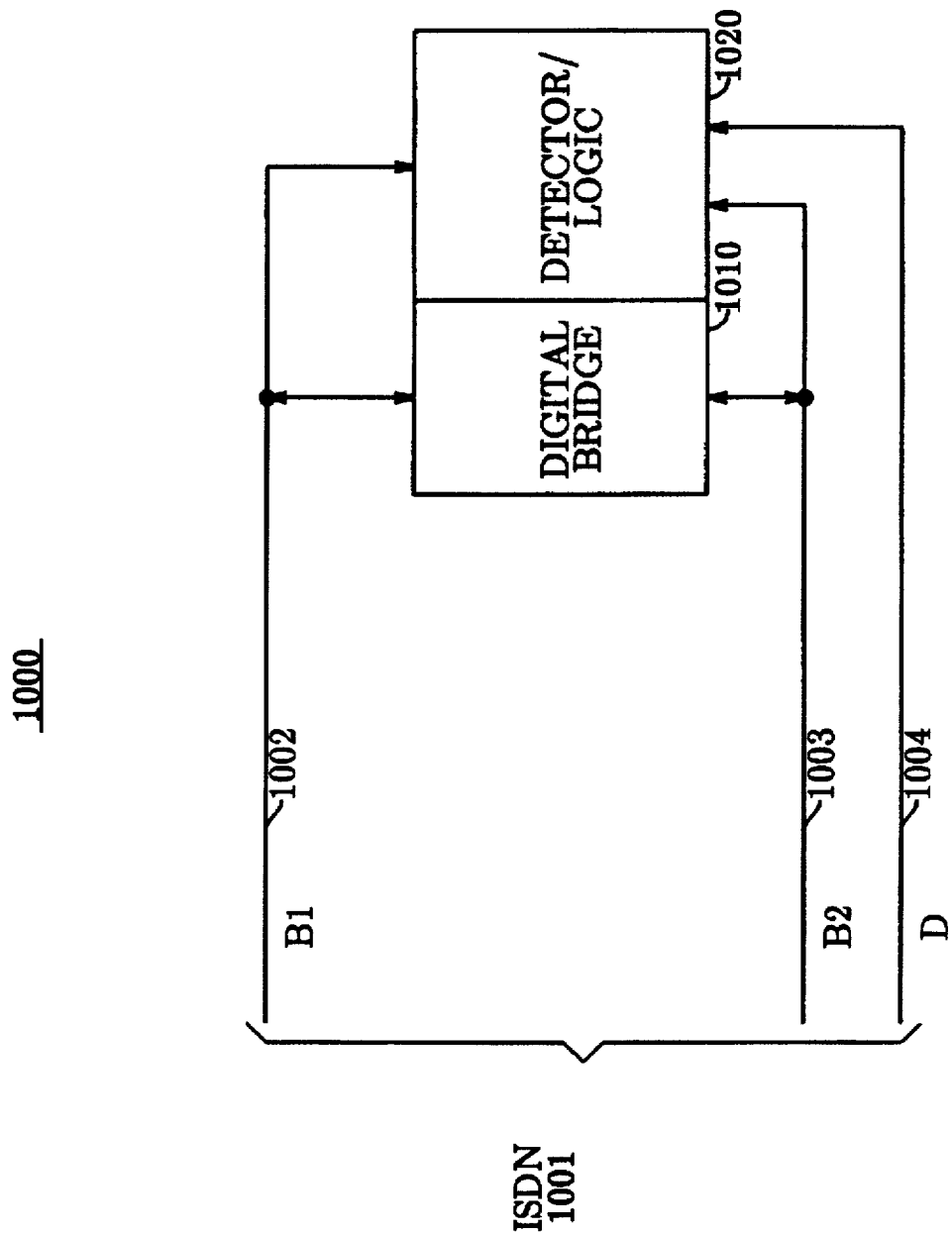
FIG. 10 is a high-level block diagram of the controller arranged to terminate an ISDN line having at least two B-channels, the controller being arranged with a line interface unit to effect bridging of the two B-channels.

Whereas the foregoing illustrative embodiments have been described in terms of two loops terminating in the controller, as already alluded to, it is readily contemplated that only one loop is required if the loop is an ISDN line providing 2B+D type service (at least). FIG. 10 depicts in block diagram form circuitry 1000 for accomplishing all the aforementioned services via ISDN loop 1001. With ISDN, the major difference between the embodiments described with respect to FIGS. 3 and 7 and the embodiment of FIG. 10 is that the signals on the B channels are digital in format (whereas the previous description has been couched in terms of analog signals); thus it is not necessary to bridge the two incoming loops with an analog arrangement such as shown in FIG. 6. Rather, bridging may be accomplished digitally, that is, incoming bits on one B-channel are forwarded as outgoing bits on the other B-channel, and vice versa; digital bridge 1010 represents such an arrangement. Coupling of the channels through digital bridge 1010 is controlled by detector/logic circuitry 1020, which also receives information from B-channels 1002 and 1003 and D-channel 1004. Information from the D-channel allows for the byte-by-byte alignment of digital data on the B-channels, therefore effecting digital bridging in a straightforward manner. Moreover, all other functions described with respect to FIGS. 1–9 can be accomplished with ISDN once a conversion from digital to analog is effected in circuitry 1000.

Although various embodiments which incorporate the teachings of the present invention have been shown and described in detail herein, those skilled in the art can readily devise many other varied embodiments that still incorporate these teachings. For instance, whereas the above descriptions have been couched in terms of discrete digital components, it is readily apparent that the functions described may be carried out using a programmable controller, that is, one wherein the main functions are effected using software to control the elements such as the DTMF transmitter(s) and DTMF receiver(s), and all switching elements. The programmable controller may, in fact, be realized with a general purpose digital computer.

I claim:

1. A method for interconnecting first and second subscriber loops via a controller located at a subscriber premises wherein both the loops terminate in the controller and are served by the same public central switching office, the method comprising the steps of in response to an incoming call on the second subscriber loop from a calling party, establishing a call connection over the second subscriber loop via the controller between the calling party and the controller, providing a menu of selectable operations accessible to the calling party via the controller, remotely selecting one of the menu operations by the calling party, each of the menu operations defining at least one sub-operation to be carded out via the first subscriber loop, controlling the first subscriber loop via the controller in response to the at least one sub-operation corresponding to the selected one of the operations, and bridging the first and second subscriber loops to form a bridged connection so as to allow the calling party to monitor the first subscriber loop and, whenever required, to provide information to the first subscriber loop.

2. The method as recited in claim 1 wherein one of the menu operations is a call connection function having a sub-operation of drawing dial tone over the first subscriber loop, and the information includes the telephone number to be called using the first subscriber loop.

3. The method as recited in claim 1 wherein the central switching office provides a call forwarding function, wherein one of the menu operations is call forwarding having a sub-operation of drawing dial tone, and the information includes the call forwarding code followed by the telephone number to which an incoming call to the first subscriber loop is to be forwarded.

4. The method as recited in claim 1 wherein the central switching office provides a call forwarding function, wherein one of the menu operations is call forwarding having a sub-operation of drawing dial tone, and the information includes the call forwarding cancel code.

5. The method as recited in claim 1 further including the step of verifying a security code provided by the calling party prior to initiating the step of providing a menu of selectable operations.

6. A method for interconnecting first and second subscriber loops via a controller located at a subscriber premises wherein both the loops terminate in the controller, the method comprising the steps of in response to an incoming call on the second subscriber loop from a calling party, establishing a call connection over the second subscriber loop via the controller between the calling party and the controller.

providing a menu of selectable operations accessible to the calling party via the controller, remotely selecting one of the menu operations by the calling party, each of the menu operations defining at least one sub-operation to be carded out via the first subscriber loop, controlling the first subscriber loop via the controller in response to the at least one sub-operation corresponding to the selected one of the operations, bridging the first and second subscriber loops to form a bridged connection so as to allow the calling party to monitor the first subscriber loop and, whenever required, to provide information to the first subscriber loop, monitoring the call connection for an identification code, removing the bridged connection, again providing the menu of selectable operations to the calling party over the second subscriber loop via the controller, remotely selecting a second one of the operations by the calling party, controlling the first subscriber loop via the controller in response to the at least one sub-operation corresponding to the second selected one of the operations, and bridging the first and second subscriber loops to form a second bridged connection so as to allow the calling party to monitor the first subscriber loop and, whenever required, to provide information to the first subscriber loop.

7. A method for establishing a call connection over a subscriber loop terminating in a controller, the method comprising the steps of storing a pre-selected telephone number in the controller, detecting a first incoming call signal over the loop via the controller without completing a call connection over the loop, storing information relating to the time of arrival of the first incoming call signal in the controller, detecting a second incoming call signal over the loop without completing a call connection over the loop, storing information relating to the time of arrival of the second incoming call signal, if the time difference between the time of arrival of the second incoming call and the time of arrival of the first incoming call is less than a pre-determined value, initiating an outgoing call over the loop with reference to the pre-selected telephone number, and establishing a call connection between the loop and the controller whenever the outgoing call is answered.

8. The method as recited in claim 7 further including another subscriber loop incoming to the controller, the method further comprising the steps of establishing a call connection between the other subscriber loop and the controller whenever the outgoing call is answered by a called party remotely responding to the outgoing call, providing a menu of selectable operations accessible to the called party via the controller, remotely selecting one of the menu operations by the called party, each of the menu operations defining at least one sub-operation to be carded out via the other subscriber loop, controlling the other subscriber loop via the controller in response to the at least one sub-operation corresponding to the selected one of the operations, and bridging the subscriber loop and the other subscriber loop to form a bridged connection so as to allow the called party to monitor the other subscriber loop and, whenever required, to provide information to the other subscriber loop.

9. The method as recited in claim 8 wherein one of the menu operations is a call connection function having a sub-operation of drawing dial tone over the other subscriber loop, and the information includes the telephone number to be called using the other subscriber loop.

10. The method as recited in claim 8 wherein the other subscriber loop is served by a central office providing a call forwarding function, wherein one of the menu operations is call forwarding having a sub-operation of drawing dial tone, and the information includes the call forwarding code followed by the telephone number to which an incoming call to the other subscriber loop is to be forwarded.

11. The method as recited in claim 8 wherein the other subscriber loop is served by a central office providing a call forwarding function, wherein one of the menu operations is call forwarding having a sub-operation of drawing dial tone, and the information includes the call forwarding cancel code.

12. A method for interconnecting first and second ISDN channels of an ISDN line via a controller located at a subscriber premises, the ISDN line being served by a public central switching office, the method comprising the steps of in response to an incoming calling on the second ISDN channel from a calling party, establishing a call connection over the second ISDN channel via the controller between the calling party and the controller, providing a menu of selectable operations accessible to the calling party via the controller, remotely selecting one of the menu operations by the calling party, each of the menu operations defining at least one sub-operation to be carded out via the first ISDN channel, controlling the first ISDN channel via the controller in response to the at least one sub-operation corresponding to the selected one of the operations, and bridging the first and second channels to form a bridged connection so as to allow the calling party to monitor the first ISDN channel and, whenever required, to provide information to the first ISDN channel.

* * * * *